Figure 1:
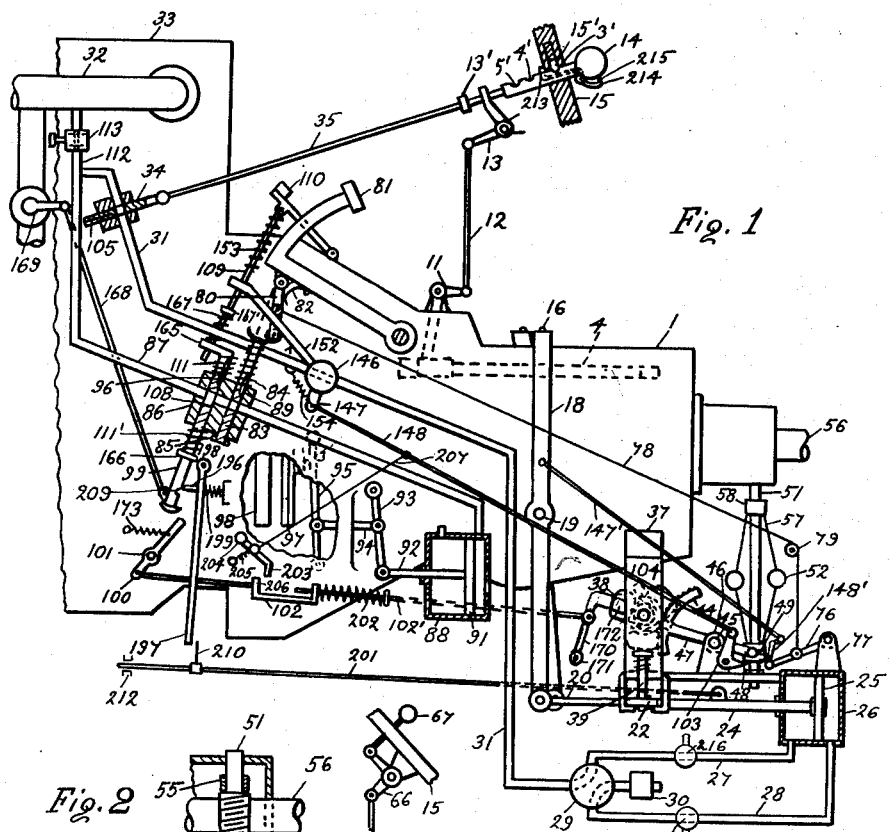

June 27, 1939.    J. J. DRABIN    2,163,872
AUTOMATIC TRANSMISSION
Filed Sept. 6, 1933    3 Sheets-Sheet 1

JOHN J. DRABIN
INVENTOR

BY John P. Nikonow
ATTORNEY

June 27, 1939.   J. J. DRABIN   2,163,872
AUTOMATIC TRANSMISSION
Filed Sept. 6, 1933   3 Sheets-Sheet 2
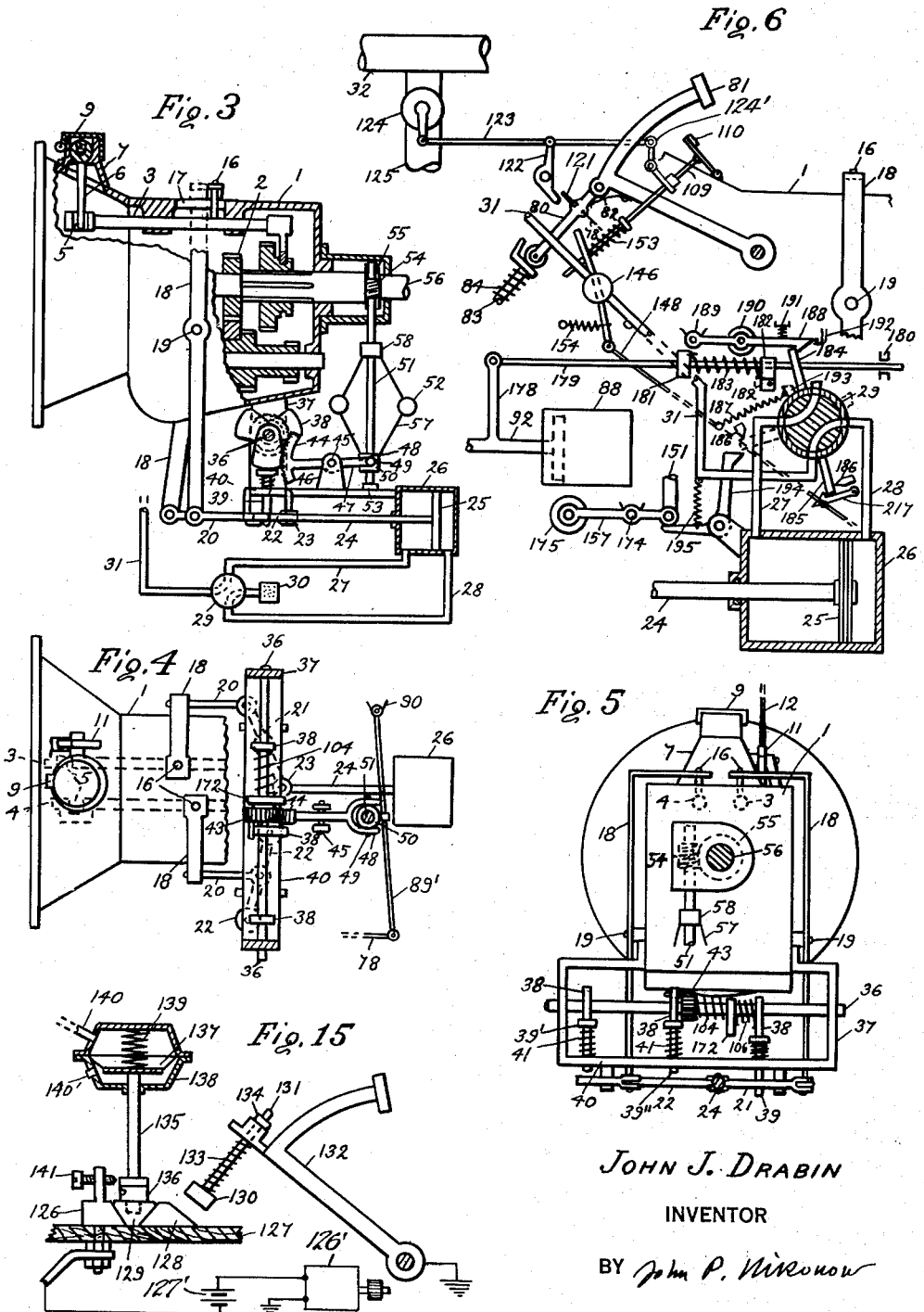
JOHN J. DRABIN
INVENTOR
BY John P. Mironow
ATTORNEY June 27, 1939.   J. J. DRABIN   2,163,872
AUTOMATIC TRANSMISSION
Filed Sept. 6, 1933   3 Sheets—Sheet 3
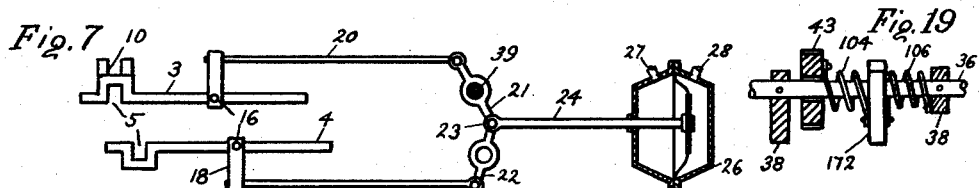
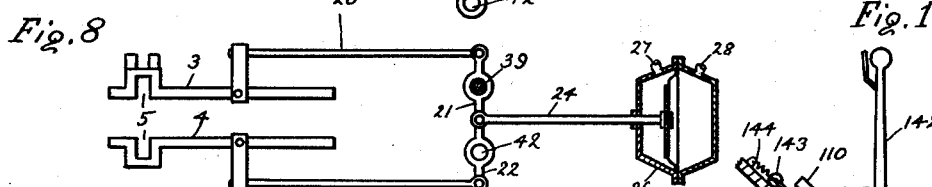
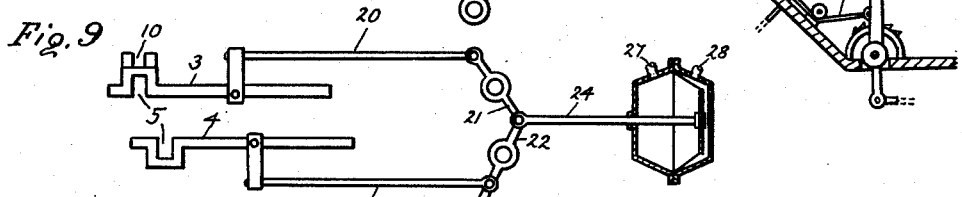
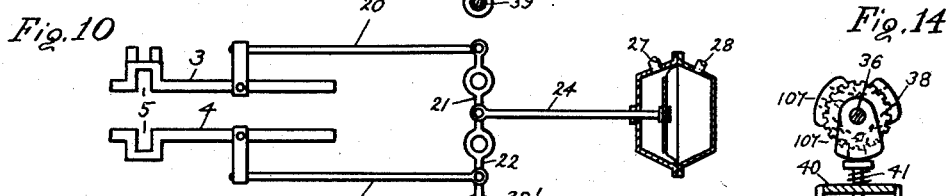
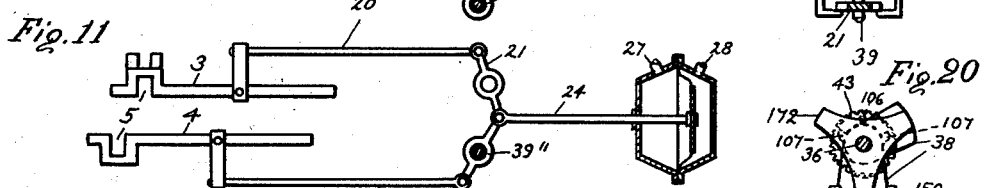
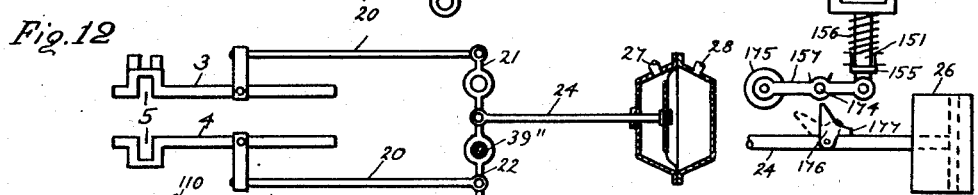
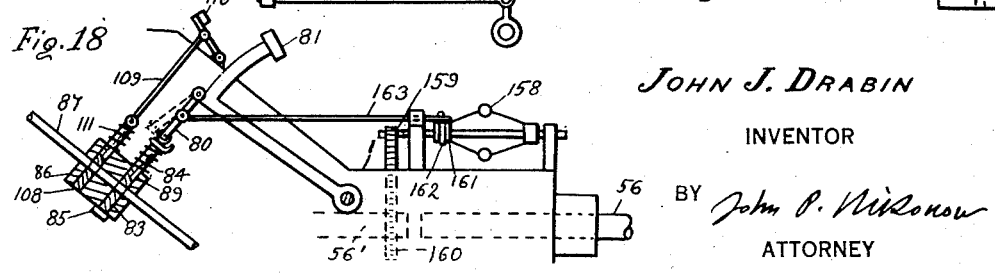
JOHN J. DRABIN
INVENTOR
BY John P. Nixonow
ATTORNEY Patented June 27, 1939

2,163,872

UNITED STATES PATENT OFFICE 2,163,872

AUTOMATIC TRANSMISSION

John J. Drabin, New York, N. Y., assignor, by mesne assignments, to Bragg-Kliesrath Corporation, South Bend, Ind., a corporation of New York Application September 6, 1933, Serial No. 688,339

18 Claims. (Cl. 192—.01)

My invention relates to an automatic transmission and has particular reference to a transmission for an automobile or a similar automotive vehicle.

In ordinary automobile transmissions the gear shift is accomplished manually, the operation requiring a certain amount of skill on the part of the driver. The gear shift is made easier by certain improvements, such as an automatic arrangement for synchronizing the respective gears before bringing them into mesh, also a more or less automatic operation of the vacuum motor for the engine clutch.

It is desirable, however, to have a fully automatic transmission, in which all the gear shifts (except for the reverse) are accomplished automatically, without any attention from the driver.

The object of my invention is to provide such an automatic transmission. For this purpose I provide a vacuum cylinder connected through a valve with the intake manifold of the automobile engine, and I connect this cylinder with the gear shifting rods in the transmission. I provide a mechanism for selectively connecting the cylinder with one or the other of the shifting rods; for controlling and operating the selective connections I provide a centrifugal governor connected with the driven shaft of the transmission. I also provide operative connections between the governor and the valve of the cylinder in order to operate the proper gear shifts when corresponding predetermined speeds of the driven shaft are reached. Means is also provided for adjusting manually these gear shifting speeds of the governor.

For the most satisfactory operation of my system it is desirable to have a servo motor for operating the engine clutch. I prefer to use for this purpose also a vacuum cylinder connected with the intake manifold of the engine. The controlling valve of this clutch cylinder I connect with the governor in such manner that the clutch is automatically disconnected every time when gears are shifted.

It is possible to use the engine as a brake with my system, and I also provide means to prevent the gears from being shifted when the brake is applied, except when the speed drops below a certain predetermined minimum, at which point a low gear becomes automatically brought into mesh, and the engine clutch becomes disconnected in order to prevent stalling the engine.

With my system it is possible to revert to the manual gear shift if necessary, in which case the automatic devices become disconnected.

My invention is more fully described in the accompanying specification and drawings in which—

Figures 2, 16, 17:
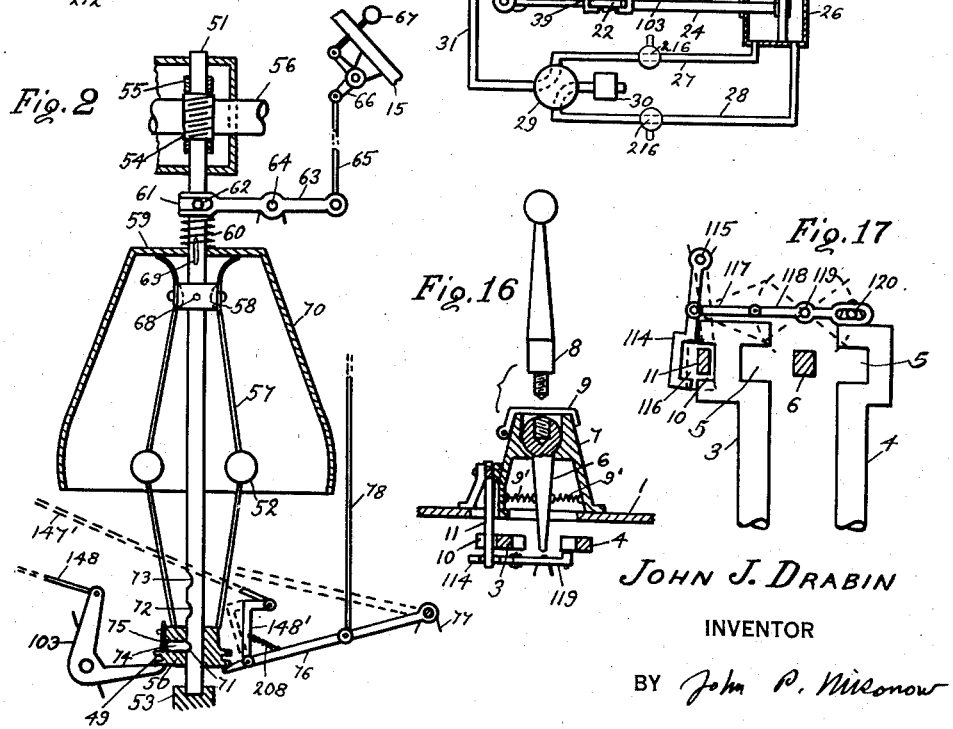

Fig. 1 is a partial elevation of the automobile power plant with my system shown more or less diagrammatically, Fig. 2 is a detail view of the governor, Fig. 3 is an elevation of the transmission partly in section, Fig. 4 is a top view of same, Fig. 5 is an end view of same, Fig. 6 is a detail view of the brake pedal and its connections with my system, Fig. 7 is a diagrammatic view showing gear shifting connections with the first speed connected, Fig. 8 is a similar view with the gears brought back into their neutral position, Fig. 9 is a similar view for the second speed in operation, Fig. 10 is a view of the gears in neutral, Fig. 11 is a view showing position of the levers for the third speed, Fig. 12 is another transitional neutral position, Fig. 13 is a view of the connection between the emergency brake and the accelerator, Fig. 14 is a detail view of the camshaft, Fig. 15 is a view of the starting switch, Fig. 16 is a detail view of the manual gear shift, Fig. 17 is a gear shift interlock, Fig. 18 is a view of a modified arrangement, Fig. 19 is a detail view of the camshaft, and Fig. 20 is another detail view of the camshaft.

I use in my arrangement a standard gear housing or box 1 for ordinary transmission gears 2. Gear shifting rods 3 and 4 are provided, the rod 3 being for the reverse and first speed, and the rod 4 for the second and third speeds. The rods are provided with slots 5 for the manual gear shifting lever 6 rotatively supported in a bracket 7 and held in a middle or inoperative position by springs 9'. The handle 8 is usually removed and the bracket covered with a lid 9. The reverse gear is shifted manually by a lever 11 engaging a slot 10. A rod 12 connects the lever 11 with a crank 13 in which slides a rod 35 with a bushing 13' and a handle 14 slidably fitted in a dashboard 15. A spring latch 15' engages slots 3', 4' and 5' for the first speed, neutral and reverse.

The rods 3 and 4 have pins 16 passing through a slot 17 and connected with the ends of arms 18 pivotally supported on pins 19 at the sides of the box 1. The lower ends of the arms are pivotally connected with links 20 the other ends of which are pivoted to selector bars 21 and 22. These bars are pivotally joined together at the middle point 23 which is also pivoted to the end of a sliding rod 24.

The other end of the rod 24 is attached to a piston 25 sliding in a cylinder 26. The ends of the cylinder are connected by pipes 27 and 28 with a four-way valve 29. The third outlet of the valve is connected with the outside air through a filter box 30 filled with metal shavings or similar air filtering material. The fourth outlet is connected by a pipe 31 with the intake manifold 32 of the engine 33. A valve 34 is placed in the pipe 31 and is connected by a rod 35 with the handle 14 of the reverse gear shift.

A camshaft 36 is rotatively supported in brackets 37 mounted on the sides of the housing or box 1. This shaft has three cams 38 spaced 120° apart and adapted to press down selector fingers or pins 39 39' and 39'' slidably supported in a guiding bar 40. Springs 41 tend to keep the fingers in raised position. When depressed the fingers slide into holes 42 in the selector bars 21 and 22. A gear 43 is mounted on the shaft 36 and is in mesh with a gear sector 44 rocking on a shaft 45 supported in a bracket 46. The other end of the sector arm 47 has a fork 48 engaging a slot 49 on a hub 50 sliding on a vertical shaft 51 of a governor. The governor shaft turns on a foot bearing 53 and has a worm 54 on its upper end in mesh with a worm gear 55 mounted on a driven shaft 56 of the transmission. The springs 57 of the governor are pivotally supported on an upper hub 58 which is attached to the shaft 51. The upper ends of the springs flare out under a sliding plate 59. A helical spring 60 is placed between the plate 59 and a sliding bushing 61. The latter has trunnions 62 fitted in forked ends of a lever 63 pivoted at 64 and connected by a link 65 and lever 66 with a handle 67 on the dashboard 15.

The hub 58 and the plate 59 turn with the shaft 51, the hub being fastened with a pin 68, and the plate sliding on a key 69. A bell 70 extends down from the plate forming a protective housing for the weights 52 and, at the same time, preventing the weights from flying apart too far at high speeds. The shaft 51 has three notches, 71, 72 and 73, corresponding to the first, second and third speeds, the range of the second speed being between the second and third notches, and for the first speed between the first and second. The hub 50 has a transverse hole in which a pin 74 slides being pressed against the shaft 51 by a spring 75.

A lever 76 is pivoted with one end in a bracket 77, the free end extending under the bushing 50. A cable or chain 78 extends from the lever 76, passes over a sheave 79 and is connected with a lever or rod 80. The latter is pivotally connected with a brake pedal 81. A spring 82 tends to turn the lever 80 into engagement with the end of a valve 83 pulling on the cable 78 and tending to raise the lever 76. A roller is provided on the free end of the lever 80 to facilitate its sliding over the end of the valve. The latter is curved at the end so as to prevent the rod 80 from sliding over too far. A spring 84 tends to keep the valve in the raised position with a pin or shoulder 85 on the valve limiting the upward movement so as to keep the valve open with its aperture registering with the central passage in a valve body 86 through which passes a pipe 87 connecting the manifold 32 with a vacuum cylinder 88. A groove 89 in the valve 83 connects the cylinder 88 with the outside air when the valve is closed or pushed down against the tension of the spring 84.

A supplementary lever 89' may be provided in order to bring the cable 78 to the side of the gear box 1, as shown in Fig. 4. The lever 89' is connected with the lever 76 and pivotally mounted at 90.

A piston 91 is fitted in the cylinder 88 and is connected by a rod 92 with an outside lever 93 connected by a rod 94 with an inside lever 95 engaging a sleeve on a clutch plate 97 of the engine flywheel 98. The atmospheric pressure on the piston 91 disengages the clutch when there is vacuum in the pipe 87. A second valve 108 is placed in the pipe 87 in the housing 86. It is provided with a bleeder slot 96 for admitting air into the cylinder, and it has a lug 165 and a retrieving spring 111 which tends to keep the valve open. A second spring 111' resting against an enlargement 166 limits the movement of the valve. A spring 167 provides a resilient connection between the accelerator pedal 110 and the valve, the upper end of this spring resting against a knob or enlargement 167'. The valve 108 has an extension 99 connected by a rod 168 with a supplementary throttle or butterfly valve 169 leading from the carburetor (not shown) to the manifold 32. This valve is opened when the valve 108 is opened. A lever 100 mounted on a pin 101 engages the lower end of the extension 99 when rotating on the pin under action of a spring 173. The other end of the lever 100 is connected with a rod 102 slidably connected with a rod 102'. A spring 202 tends to keep these rods apart thereby deflecting the lever 100 to the right against the tension of the spring 173. The rod 102' is connected with a lever 170 pivoted on a pin 171 and engaging a triple cam 172 on a shaft 36. The projections of the cam 172 are located midway between the points of the cams 38. A hook 203 rotating on a pivot 204 under action of a spring 205 engages a shoulder 206 thereby preventing the rod 102 from moving to the right. A cord 207 connected with the rod 148 releases the rod 102 when the valve 146 is opened.

The pipes 31 and 87 merge together into a common pipe 112 provided with a cock 113 which can be closed by hand if it is desired to disconnect the automatic features of the transmission and to operate it manually.

A transmission interlock is provided in order to prevent the reverse from being engaged when second or third gear is in mesh. For this purpose a lever 114 is provided pivoted on a pin 115 and having a slot 116 adapted to engage the operating end of the reverse gear shift lever 11. The lever 114 is connected by a link 117 with the end of an interlock lever 118 pivoted on a pin 119 between the rods 3 and 4. The other end of the rod 118 has a slot engaging a pin 120 on the end of the rod 4 which operates gears for the second and third speeds. As shown in Fig. 17, any displacement of the rod 4 from its neutral position will cause a pull on the link 117 closing the lever 114 over the gear shift lever 11 thereby locking the latter.

The rod 80 has a resilient lug 121 adapted to engage a lever 122 during the first part of the movement of the brake pedal. The lever is connected by a rod 123 with the throttle valve 124 in the intake pipe 125 of the engine. The valve 124 is connected with the accelerator by a lever 124' and the rod 123 and is used to control the operation of the engine.

A starter switch is shown in Fig. 15. It consists of an insulated contact block 126 mounted on a board 127 and connected with the starting motor 126' and a battery 127'. A second block 128 is mounted on the same board. The blocks are tapered so that a contact is established between them when a metal plug 129 is inserted between them. A contact block 130 on a rod 131 is slidably fitted in a clutch pedal 132 and is provided with a spring 133 and a collar 134.

The block 129 is mounted on a rod 135 with an insulation block 136 between them. The rod 135 is attached to a piston on a diaphragm 137 in a cylinder 138. A spring 139 tends to push the piston down keeping the block 129 in contact with the blocks 126 and 128. A pipe 140 connects the cylinder with the manifold 32. A set screw 141 is provided for locking the block 129 in the raised position when the battery is too weak for cranking the engine, and the latter is started by towing the car with the transmission connected.

The accelerator 110 is provided with a locking device operated by the emergency brake lever 142 as shown in Fig. 13. A roller 143 is supported on a spring 144 and is attached to a cable 145 the other end of which is attached to the emergency brake lever 142. When the lever is pulled back, the roller 143 is pulled under the accelerator pedal thereby rendering it inoperative.

A supplementary valve 146 is placed in the pipe 31 and is connected by an arm 147 and a rod 148 with a lever 103 pivotally mounted on a bracket 46. The other end of the lever 103 fits under the bushing 50 of the governor so that the governor in its low position corresponding to a certain minimum speed, turns the lever 103 thereby opening the valve 146. A spring 154 tends to keep the valve closed. An arm 152 extends from the valve 146 slidably engaging the rod 109. A spring 153 opens the valve 146 when the accelerator pedal is depressed.

The pinion 43 turns freely on the shaft 36 and is connected by a spring 104 with a cam 172 which also turns on the shaft 36 and is connected by a spring 106 with the cam 38. (Fig. 19). A spring 104 is placed on the shaft 36 and is attached with one end to the gear 43, and with the other end to the cam 172 tending to keep the cam 172 midway between the axes of the cams 38.

A fork 150 engages the cam 172 with sufficient clearance to permit the rocking of the cam between the sides of the fork while the cam 38 retains its contact with the corresponding pin 39. The fork is mounted on a rod 151 with a retaining shoulder 155 and a spring 156 adapted to keep the fork in the raised position. The other end of the rod 151 is pivotally connected with a lever 157 rotating on a pin 174. The other end of the lever 157 has a roller 175. This arrangement is shown schematically in Fig. 20, the rod 151 being actually displaced from the axes of the pins 39 in order to clear the bar 40.

The roller 175 is engaged by a pawl or hook 176 on the rod 24. The pawl is pivoted on the rod and has a lug 177 preventing the rotation of the pawl to the right. The pawl therefore can engage the roller 175 and turn the lever 157 only when the rod 24 reaches the end of its travel to the left. On the way back to the right the pawl turns without lifting the roller 175. When the roller is raised, the fork 150 is lowered thereby releasing the cam 172.

The rod 92 has a lug 178 connected with a rod 179 passing through a bearing 180. A bushing 181 is fastened on the rod 179 and another bushing 182 slides on the rod. A spring 183 is placed on the rod and is fastened with its ends to the bushings 181 and 182 (Fig. 6).

The valve 29 has arms 184 and 185. The arm 185 limits the rotation of the valve to 90° between the stops 186. A spring 187 tends to keep the valve turned to the left into a position in which the right end of the cylinder 26 is connected with the vacuum pipe 31. The valve is further retained in this position by a hook 188 pivoted on a pin 189 and provided with a roller 190 in the middle. A spring 191 presses the hook down. Its downward movement is limited by a stop 192. The roller is placed at such distance from the rod 179 that the bushing 182 freely passes under the roller while the larger bushing 181 engages the roller and releases the hook from the arm 184. The bushing 182 engages a lug 193 on the valve thereby turning it one quarter of a turn until the bushing 182 passes over the lug 193. This happens because the lug 193 is displaced to the right as shown in Fig. 6. The lug 193 and the arms 184 and 185 are connected with the inner rotating core of the valve, the outer shell being stationary and connected with the pipes 27, 28 and 31. The valve is retained in its new position by the end of a lever 194 engaging the arm 185 shown with dotted lines in its new position. A spring 195 tends to turn the lever 194 to the right after it has been deflected by the arm 185. The other end of the lever 194 rests against the lower end of the rod 151 so that the latter, when lowered, turns the lever 194 thereby releasing the arm 185 and permitting the valve to be turned to the left by the spring 187.

A block 148′ is pivotally connected with the lever 76 and is also connected by a rod 147′ with the gear shifting lever 18 which operates the second and third speeds. The connection is made so that when the third speed is used, the block 148′ is moved near the governor and becomes engaged by the bushing 50 at a speed approaching the speed at which the second gear becomes engaged. A spring 208 tends to move the block away from the governor.

A rod 197 is pivoted on a pivot 198 and has a lug 196 pressed against the extension 99 by a spring 199. A slot 209 is located on the extension 99 just below the pin 196 when the valve 108 is supported in the open position by the springs 111 and 111′. The pin 196 engages the slot 209 when the extension 99 is pushed up by the lever 100 thereby retaining the valve 108 in the open position even if the accelerator pedal is depressed. The opening in the valve 108 is made sufficiently large to keep the valve open in its raised position. The lower end of the arm 197 may be engaged by a spring or resilient lug 210 supported on a rod 201 attached with one end to the rod 24 and sliding with the other end in a bearing 212.

A simplified arrangement is shown in Fig. 18. This arrangement is used with a conventional type of transmission having a vacuum clutch motor and an ordinary type of synchromesh gear shift. The governor 158 in this case is driven by a chain 159 from a sprocket 160 on the transmission shaft 56′. The sliding bushing 161 has a rotating collar 162 connected by a rod 163 with the lever 80. The connections are made so that the lever 80 is pushed off the valve stem 83 when the governor 158 is in its slow speed position thereby opening the valve 83 and releasing the clutch. This arrangement permits the free coasting of the car down hill when the accelerator is released, uses engine as a brake when the brake pedal is depressed, and prevents the engine from being stalled if the speed of the car is reduced below a certain safe limit.

The operation of my system is as follows.

With the engine not running the first or low gear is in mesh, the pin 39 engaging the bar 21.

The reverse gear shift handle 14 is held by the latch 15' engaging the slot 3'.

If the engine is not running, there being no vacuum, the clutch will be engaged although the valves 83 and 108 are open. The car being in low gear, it will not roll by itself, so that it will not be necessary to apply the emergency brake under ordinary parking conditions. In order to start the engine the clutch pedal 132 is depressed releasing the clutch and closing the starter switch. When the engine starts up and vacuum is built up in the manifold, the cylinder 88 will be energized releasing the clutch. The clutch pedal may be then released and will not be needed as long as the engine is running.

The reverse gear can be used only when the transmission is in low gear due to the transmission interlock shown in Fig. 17. If it is desired to use the reverse, the handle 14 is pulled out. During the first portion of its movement the rod 35 will slide freely through the hole in the lever 13 so that the latter will not move until the rod 13' reaches the lever. The valve 34 will then be closed and the bleeder slot 105 opened into the pipe 31 thereby admitting air to both sides of the piston 25. The rod 24 can be then moved freely. With the further pull on the handle 14 the gears will pass the neutral point at the notch 4' and then will go into the reverse at the notch 5'. The automatic gear shift will remain inoperative as long as the reverse is used. This is necessary in order to prevent any gear shifting operations from taking place if the speed on the reverse reaches a high point. The clutch will remain engaged as long as the accelerator pedal is depressed which action closes the valve 108, but will be again disengaged as soon as the accelerator pedal is released.

The governor bushing 50 in its lowest position engages the ends of the levers 76 and 103. The bushing is held in this position by the pin 74 engaging the notch 71. The lever 76, pulling on the rod 78, disengages the rod 80 from the valve 83 thereby permitting the same to remain open regardless of the position of the brake pedal. The pull of the lever 103 keeps the valve 146 open.

When the engine is running, the low gear remains in mesh, and the car will move forward as soon as the accelerator pedal is depressed thereby closing the clutch valve 108. As the speed of the car increases, the governor will tend to raise the bushing 50, but will be held by the pin 74 until the speed reaches a value corresponding to the limiting speed at which the second speed is used. At that speed the bushing 50 will be forced out of the engagement with the slot 71 and will jump to the next slot 72 where it will be held. The spring 104 will be wound, but the cam 38 will remain in contact with the pin 39, as the cam 172 will be held by the edge of the fork 150. The points of the cam 172 being narrow, the corresponding point will slide off the end of the lever 170, which accordingly will be free to turn to the right under pressure from the spring 173, this pressure being transmitted through the rods 102 and 102' and the spring 202. The lever 100, passing under the end of the bar 99, will raise the same until the notch 209 comes in opposition to the lug 196 which will accordingly engage the notch, holding the valve in the open position regardless of the pressure from the accelerator pedal, as the passage in the valve 108 is sufficiently large to keep the pipe 87 open in these positions.

The pipe 87 will be now open, the brake pedal, of course, not being used, so that the piston 91 will move to the right due to the vacuum, releasing the engine clutch. The movement of the rod 92 will bring the pivoted block 182' against the lug 193 of the valve 29, not moving the latter, however, the arm 184 being held by the hook 188. The spring 183 will be compressed until the block 181 raises the roller 190 releasing the hook 188. At the end of the travel of the piston 91, therefore, when the engine clutch is fully released, the valve 29 will snap through a quarter of a turn under pressure from the spring 183 which is much stronger than the spring 187, the lug 185 coming to rest against the post 186, deflecting in its movement the lever 194 and passing above its end. The arm or lever 188 will come to rest against the support 192. In this position of the valve the block 182' will slide over the lug 193. The left side of the cylinder 26 will be now connected with the vacuum pipe 31 and the right side with the atmosphere, so that the piston 25 will move to the left bringing the gears into neutral, as shown in Fig. 8. The gears cannot move into the reverse from this position as the reverse handle 14 is locked by a latch 213 connected with a handle 214 pivoted on the handle 14 and kept in a locked position by a spring 215. It becomes released only when the handle 14 is taken by the driver for pulling the handle out and meshing the reverse gears, the handle 214 being pressed against the handle 14 thereby releasing the latch 213.

Upon completion of the movement of the piston 25 to the left when the gears are brought into the neutral, the latch 177 raises the roller 175 thereby lowering the fork 150.

The cams will turn 120° to the position corresponding to the notch 72 of the governor, and the next lug of the cam 172 will be caught by the returning fork 150. The downward movement of the rod 151 of the fork will also turn the lever 194 thereby releasing the valve 29, which will accordingly return to its original position by making quarter of a turn to the left. The arm 184 will be caught under the hook 188. The valve 108 remains open all this time as the spring 210 deflects while passing to the other side of the arm 197. With the valve 29 in the left position the piston 25 will move to the right shifting the second gear into mesh as per Fig. 9. The speed of the movement of the piston 25 can be adjusted by turning the throttle valves 216 in the pipes 28. Upon completion of the movement of the piston 25 the spring 210 will engage the arm 197 releasing the extension 99 from the lug 196 and permitting the valve 108 to be moved down and closed by the pressure from the accelerator. The engine clutch will be therefore engaged by the pressure from the clutch spring. Prior to the release of the rod 99 the next lug of the cam 172 will pass under the lever 170 turning the lever 100 to the right. In this position of the mechanism the car will continue to travel on the second gear. With the further increase of speed, when it reaches the limiting value for shifting to the high gear, the governor will pull the bushing 50 off its place turning the cam 172 and turning thereby the lever 100. The valve 108 will be open, and the sequence of gear shifting operations will again take place until the transmission will be changed to the high gear or third speed, with the pin 39" replacing the pin 39'.

It may be noted that the pins are being changed only when the selector bars 21 and 22 are aligned for the neutral position.

The car will continue to travel on the high gear with the governor locked on the notch 73. It will be prevented from any further movement upward by the bell 70 holding the weights 52.

Whenever the accelerator pedal 110 is released, the valve 108 will return into its open position by the spring 167, the notch 209 not reaching, however, the lug 196. The vacuum pipe 31 being open into the cylinder 88, the engine clutch will be released, and the car will coast with the engine disconnected from the transmission. The valve 146 being closed, the hook 217 (Fig. 6) will be pulled up by the rod 148, engaging the end of the arm 185 and locking the valve 29 in the operative position for the gears in mesh. The movement of the piston 91 to the right, therefore, cannot turn the valve 29, the block 182' resting against the lug 193 and the spring 183 being compressed. The raising of the arm 188 by the block 181 will not change the conditions as long as the hook 217 engages the arm 185. The gears can be shifted, however, if desired, from the third to the second gear, when the car speed is approximately correct for such a shift, by depressing the accelerator for a short period. This action will release the valve 29 from the hook 217. The governor bushing 50, being pushed down by the springs 57, will turn the arm 47 and the cam 172, thereby beginning the series of operations exactly as described above, except that the pin 39' will take place of the pin 39''.

With the further slowing down of the car and with the accelerator depressed (for instance, when climbing a hill), the gears will be again changed, from the third to the second, when the car speed reaches a predetermined value.

If the car is coasting with the accelerator pedal released, then the valve 108 is open thereby keeping the clutch released; the valve 146 is closed by the spring 154 thereby rendering the motor (cylinder) 26 inoperative; the hook 203 holds the rod 102 preventing the arm 100 from moving even when the lever 170 becomes released; the hook 217 holds the valve 29 preventing its movement even when the piston 91 moves.

As soon as the brake pedal is depressed, however, the valve 83 becomes closed, rendering the motor (cylinder) 88 inoperative and permitting the engine clutch to become engaged. The engine is then used as a brake. If it is desired to use the second gear for the brake, then the car speed is brought down sufficiently for such a change, and the accelerator depressed for a short time, until the change is completed.

If the car speed drops to a certain low limit while driving in high gear and using brake, then the governor bushing 50, depressing the levers 76 and 103, will open the valve 146, rendering the gear shift operative for change to the low gear, pulling at the same time the rod 80 from the brake and opening the valve 83, thereby releasing the clutch. The engine is prevented thereby from being stalled by the application of the brakes. The release of the clutch takes place sooner if the high gear is in, as then the block 148' is advanced to the governor.

In using the brake on high gear it is not necessary to shift to the second by the use of the accelerator as described, and the gears will be automatically shifted to the low gear when the governor speed drops below a predetermined limit. If the third gear has been shifted to the second while using the brake, and the speed rises again, then the braking will continue on the second gear unless the gears are shifted at the higher speed by the use of the accelerator.

In passing directly from the third to the first gears, the governor will slide from the notch 73 to the notch 71 winding the spring 104 through two thirds of the turn or 240°.

The speeds at which the governor changes the gears can be changed or regulated by changing the tension of the springs 57. This is accomplished by pulling or pushing the governor handle 67 on the dashboard. The lever 63 is thereby turned one way or the other, changing the tension of the spring 60 which in turn changes the pressure of the plate 59 on the ends of the spring 57. The bushing 61 slides on the shaft 51 on a keyway similar to the keyway 69.

The auxiliary lever 122 for opening the main throttle valve 124 by the brake pedal 81 is needed in order to raise the speed of the engine at the moment when the brakes are applied. This will equalize the engine speed with the speed of the transmission shaft so as to obtain a smooth engagement of the engine clutch.

In case of some defects in the automatic transmission mechanism the ordinary manual gear shift can be used by inserting the handle 8 into the socket of the rod 6 and closing the valve 113.

The handle 8 can be used for engaging the reverse gear if the handle 214 tied to the handle 14 is actuated thereby releasing the latch 213.

The emergency brake may be very seldom used with my system, therefore its handle may be moved out of the way into a corner. The clutch pedal is used only for starting the engine and for running when the automatic gear shift is disconnected, so that this pedal can be also placed out of the way into a corner. This leaves the floor in front of the car free from any encumbrances and permits the comfortable seating of three passengers.

The starter, Fig. 15, operates automatically when the clutch pedal is depressed. The starting motor is automatically disconnected as soon as the engine picks up speed and develops vacuum which causes the rod 135 to rise thereby pulling the block 129 up and disconnecting the switch.

My system has the following important advantages:

1. The driver does not use his hands for shifting the gears, except for the reverse. He uses only brake and accelerator pedals, all the gear shifting being done automatically at proper car speeds. Only one foot is used, either for depressing the accelerator, or for the brake pedal.

2. The superfluous pedals and handles can be removed from the driver's side thereby leaving the space clear for the extra passenger.

3. With my system it is not necessary to use any special free wheeling devices thereby saving in their cost and weight. The engine clutch is automatically disconnected when the accelerator is released.

4. The engine can be used as a brake at will either on the high, second or third gears.

5. The range of car speeds at which the gears are automatically shifted can be varied by the handle on the dashboard adjusting the governor.

6. Standard types of the synchromesh transmission and the vacuum operated engine clutch are employed.

7. The synchronization of the gears is made easier as in each change of gears they are brought at first into the neutral.

8. The gears are shifted automatically from second to third when climbing a hill and back from the third to the first when braking down hill.

9. There is no danger of the engine being stalled when stopping the car or slowing it down by braking, as the engine clutch automatically disengages at a predetermined slow speed of the car.

10. The engine stops in the first gear which serves as a parking brake.

11. There is no danger of driving the car with the emergency brake set, as the accelerator cannot be then used.

12. The starting up hill is made easy as the car picks up directly from the low gear without any necessity for using emergency brake. The left foot can be used for releasing the brake while the right foot depresses the accelerator pedal.

13. The starting of the engine is simplified as the starting switch becomes automatically disengaged as soon as the engine picks up speed, even if the clutch pedal is kept depressed. It is not necessary to place transmission in neutral before starting the engine.

I claim as my invention:

1. In an automatic transmission for an automobile, the combination with a housing containing transmission gears adapted to be selectively connected for different gear ratios, of sliding members for shifting said gears, a motor adapted to shift said gears, a centrifugal governor operatively connected with the driven shaft of said transmission, means to change said connections by said governor at predetermined speeds, means to disengage the engine clutch when said connections are being made, means controlled by said governor for operating said motor when said connections are made for shifting said gears and when said clutch is disconnected, means to disengage said clutch when the accelerator pedal is released, means to render said motor operative when said accelerator pedal is released, and means to release said clutch and to connect the low gear when said governor drops into a predetermined low speed position.

2. In an automobile having a geared transmission between the engine and the driven shaft, the combination with a centrifugal governor, means to rotate said governor by said driven shaft, an air operated motor a clutch operatively connected with said motor, for disconnecting said engine from said transmission, a pipe connecting said motor with said engine, a valve in said pipe operated by the accelerator pedal, a second valve in said pipe, a resilient means to keep said second valve open, a movable lever operatively connected with the brake pedal of said automobile and adapted to engage said second valve, and an operative connection between said lever and said governor, said governor being adapted in its low speed position to disengage said brake pedal from said second valve.

3. In an automatic transmission for an automobile having an engine clutch and an air cylinder for disengaging said clutch, the combination with a housing containing transmission gears adapted to be shifted for different gear ratios, of sliding members in said housing for shifting said gears, an air motor, operative connections between said motor and said members, means to render said connections selectively operative for shifting different gears, means to control said air cylinder by the rotational speed of the driven shaft of said transmission, means to control the movements of said motor by the rotational speed of said driven shaft and by said disengaging means, and means to control said selective means by said rotational speed and by the movements of said motor.

4. In an automatic transmission, the combination with a housing containing transmission gears adapted to be selectively connected for different gear ratios, of sliding members in said housing for shifting said gears, a motor adapted to selectively shift said gears, a centrifugal governor on the driven shaft of said transmission, means to control said selective connections by said governor, means to lock said governor in definite positions corresponding to different gear shifts, said governor being adapted to move rapidly from one of said positions to the other, means to release the engine clutch by the movement of said governor, and means to shift said gears by said motor when said clutch is disengaged and said connections are made.

5. In an automatic transmission for an automobile, the combination with a housing containing transmission gears adapted to be selectively connected for different gear ratios, of sliding members for shifting said gears, a motor adapted to selectively shift said gears, a centrifugal governor operatively connected with the driven shaft of said transmission, said governor being adapted at predetermined speeds to change said gear connections, means controlled by said governor for disengaging the engine clutch when said connections are being changed, means controlled by said governor for rendering said motor operative when said connections are made, and means to disengage the engine clutch when said governor is in its extreme slow speed position.

6. In an automatic transmission for an automobile, the combination with a housing containing transmission gears adapted to be connected for different gear ratios, of sliding members in said housing for shifting said gears, an air motor, means to render said motor selectively operative for shifting said gears through said members, means to control said selective means by the rotational speed of the driven shaft of said transmission, means to disconnect the engine clutch of said automobile when said gears are being shifted by said motor, means to control said disconnecting means by the rotational speed of said driven shaft, a manual means for shifting said gears into the reverse, means to render said manual shift inoperative when other gears are connected for forward speeds, and means to render the forward gear shifts inoperative when said reverse gear is in its operative position.

7. In an automatic transmission for an automobile, the combination with a housing containing transmission gears adapted to be connected for different gear ratios, of sliding members for shifting said gears, an air motor, means to render said motor selectively operative for shifting said gears through said members, means to control said selective means by the rotational speed of the driven shaft of said transmission, an automatic means for disconnecting the engine clutch of said automobile when said gears are being shifted, a pedal for manual control of said clutch, a switch for the starting motor of said engine, means to operate said switch by said pedal, and means to render said switch inoperative when said engine is running.

8. In an automatic transmission for an automobile, the combination with a housing containing transmission gears adapted to be connected for different gear ratios, of sliding members for shifting said gears, an air motor, means to render said motor selectively operative for shifting said gears through said members, means to control said selective means by the rotational speed of the driven shaft of said transmission, a motor for disconnecting the engine clutch of said automobile, means to render said clutch inoperative when the brake pedal is depressed, means to maintain said clutch motor operative regardless of the position of said brake pedal when the rotational speed of said driven shaft is at a predetermined low limit, and means to maintain said clutch motor operative at a predetermined speed above said low limit when other than the low gear is in operation.

9. In an automatic transmission for an automobile, the combination with a housing containing transmission gears adapted to be connected for different gear ratios, of sliding members for shifting said gears, an air motor, means to render said motor selectively operative for shifting said gears through said members, means to control said selective means by the rotational speed of the driven shaft of said transmission, means to render said motor operative by depressing the accelerator pedal, retrieving means for rendering said motor inoperative when said accelerator pedal is released, and means to render said motor operative regardless of the position of said accelerator pedal when the low speed gear in said transmission is placed in an operative position.

10. In an automatic transmission for an automobile, the combination with a housing containing transmission gears adapted to be connected for different gear ratios, of sliding members in said housing for shifting said gears, a motor connected with said sliding members, means to render said motor selectively operative for shifting different gears, means to control said selective means by the rotation speed of the driven shaft of said transmission, means to disengage the engine clutch from said transmission when said gears are being shifted, means to disengage said clutch when the accelerator pedal is released, means to engage said clutch when the brake pedal is depressed, and means to open the throttle valve of the carburetor of said engine during the first portion of the movement of said brake pedal, said throttle opening means being adapted to become inoperative with the further movement of said brake pedal.

11. In an automatic transmission for an automobile, the combination with a housing containing transmission gears adapted to be connected for different gear ratios, of sliding members in said housing for shifting said gears, a motor, operative connections between said motor and said members, means to render said connections selectively operative for shifting different gears, a governor operated by the driven shaft of said transmission and controlling said last named means, means to release the engine clutch when said gears are being shifted, means to render said clutch releasing means inoperative when the accelerator pedal is depressed, and means to render said accelerator pedal inoperative when the emergency brake is placed in its operative position.

12. In an automobile having a transmission between the engine and the driven shaft, the combination with a governor operatively connected with said driven shaft, means to disconnect said engine from said transmission, operative connection between said disconnecting means and the brake pedal of said automobile adapted to render said disconnecting means inoperative when the brake pedal is depressed, and means to render said operative connection inoperative when said governor is in its slow speed position.

13. In an automatic transmission for an automobile having transmission gears, an engine, a clutch between said engine and said transmission, the combination with a motor adapted to shift said gears for different gear ratios, a centrifugal governor operatively connected to the driven shaft of said transmission and adapted to control said gear shifting motor, said governor being adapted to move rapidly between positions corresponding to certain gear ratios, a power operated means for releasing said clutch, means to render said power operated means operative by the movement of said governor between said positions, means to retard the operation of said gear shifting motor until said clutch is released by said releasing means, and means to render said clutch releasing means inoperative when said motor completes the shifting of said gear for a new gear ratio.

14. In an automatic transmission for an automobile having transmission gears, an engine, a clutch between the engine and the transmission, the combination with a motor adapted to shift said gears for different gear ratios, a centrifugal governor operatively connected with the driven shaft of said transmission and adapted to control said gear shifting motor, said motor being adapted to be operative at certain positions of said governor, an engine operated means for releasing said clutch, means to render said clutch releasing means operative by the movement of said governor between said positions, means to retard the operation of said gear shifting motor until the clutch is released by said means, means to render said clutch releasing means inoperative when said motor completes the shifting of gears for a new ratio, means to render said releasing means inoperative when the accelerator pedal of said automobile is depressed, and means to render said releasing means operative with the depressed accelerator pedal when said gear shifting operation takes place.

15. In an automatic transmission for an automobile having transmission gears, an engine, a clutch between the engine and the transmission, an accelerator pedal for controlling the engine, the combination with a motor adapted to shift said gears for different gear ratios, a centrifugal governor operatively connected with the driven shaft of said transmission and adapted to control said gear shifting motor, a motor for releasing said clutch, means to render said clutch releasing motor operative by said governor when said governor moves from one operative position to the other, said operative positions corresponding to the shift of the gears by said gear shifting motor, means to render said clutch releasing means inoperative when said gear shifting motor completes the shifting of the gears, and means to render said gear shifting motor inoperative when said accelerator pedal is released for all gear ratios other than the low gear.

16. In an automatic transmission for an automobile having transmission gears, an engine, a clutch between said engine and said transmission, the combination with a motor adapted to shift said gears for different gear ratios, a governor operatively connected to the driven shaft of said transmission and adapted to control said gear shifting motor, said governor being adapted to move rapidly between positions corresponding to certain gear ratios, a power operated means for releasing said clutch, means to render said power operative means operative by the movement of said governor between said positions, means to retard the operation of said gear shifting motor until said clutch is released by said releasing means, and means to render said clutch releasing means inoperative when said motor completes the shifting of said gear for a new gear ratio.

17. In an automatic transmission for an automobile having transmission gears, an engine, a clutch between the engine and the transmission, the combination with a motor adapted to shift said gears for different gear ratios, a governor operatively connected with the driven shaft of said transmission and adapted to control said gear shifting motor, said motor being adapted to be operative at certain positions of said governor, an engine operated means for releasing said clutch, means to render said clutch releasing means operative by the movement of said governor between said positions, means to retard the operation of said gear shifting motor until the clutch is released by said means, means to render said clutch releasing means inoperative when said motor completes the shifting of gears for a new ratio, means to render said releasing means inoperative when the accelerator pedal of said automobile is depressed, and means to render said releasing means operative with the depressed accelerator pedal when said gear shifting operation takes place.

18. In an automatic transmission for an automobile having transmission gears, an engine, a clutch between the engine and the transmission, an accelerator pedal for controlling the engine, the combination with a motor adapted to shift said gears for different gear ratios, a governor operatively connected with the driven shaft of said transmission and adapted to control said gear shifting motor, a motor for releasing said clutch, means to render said clutch releasing motor operative by said governor when said governor moves from one operative position to the other, said operative positions corresponding to the shift of the gears by said gear shifting motor, means to render said clutch releasing means inoperative when said gear shifting motor completes the shifting of the gears, and means to render said gear shifting motor inoperative when said accelerator pedal is released for all gear ratios other than the low gear.

JOHN J. DRABIN.